June 2, 1970 — A. W. KIDD — 3,515,315
COMBINED SEED AND FERTILIZER DRILLS FOR AGRICULTURAL USE
Filed Jan. 23, 1967 — 3 Sheets-Sheet 2

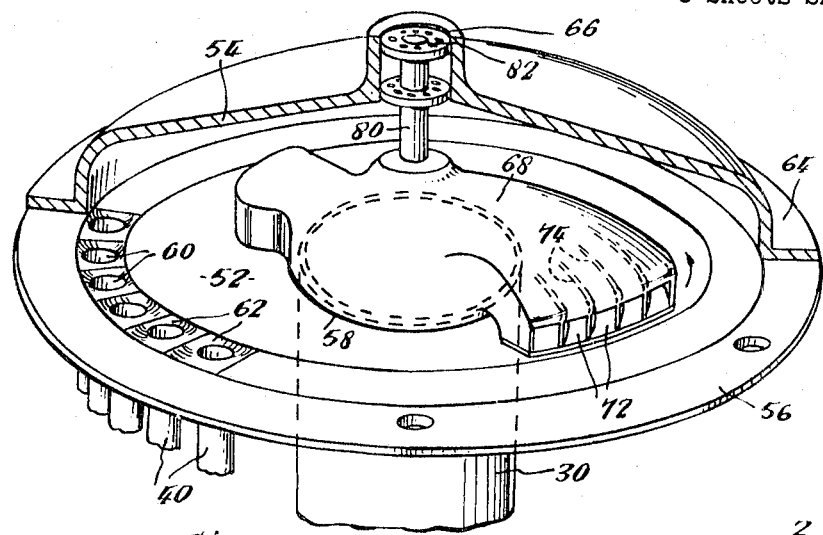
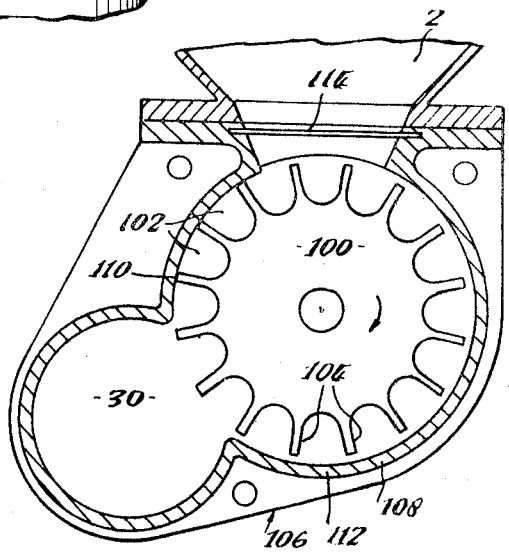
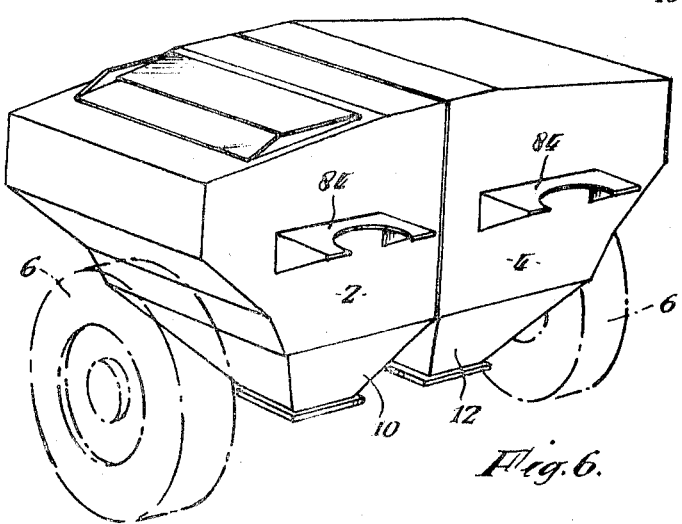

United States Patent Office 3,515,315
Patented June 2, 1970

3,515,315
COMBINED SEED AND FERTILIZER DRILLS FOR AGRICULTURAL USE
Archibald Watson Kidd, Seend, Melksham, England, assignor to Archie Kidd (Designs) Limited, Seend, Melksham, England
Filed Jan. 23, 1967, Ser. No. 619,999
Claims priority, application Great Britain, Jan. 24, 1966, 3,083/66; Dec. 12, 1966, 55,441/66; Dec. 22, 1966, 57,329/66
Int. Cl. B65g 53/08
U.S. Cl. 222—193                            3 Claims

ABSTRACT OF THE DISCLOSURE

Combined seed and fertilizer drill for agricultural use having independent systems for feeding the seed and fertilizer to the coulters wherein each system comprises a hopper having a controllable outlet, means for pneumatically conveying the contents of the hopper from said outlet to a distributor and from thence to the coulters, the said distributor having a rotatable cowl for feeding the pipes leading from the distributor to the coulters.

This invention relates to a combined seed and fertilizer drill for agricultural use. The object of the invention is to provide a machine in which the amount of seed and fertilizer conveyed to the coulters is more accurately controllable and one that is capable of carrying more seed and fertilizer than is possible in existing machines.

According to this invention there is provided a seed or fertilizer drill for agricultural use comprising a hopper having a controllable outlet, means for pneumatically conveying the contents of the hopper from said outlet to a distributor and from thence to the coulters the said distributor having a rotatable cowl for feeding the pipes leading from the distributor to the coulters. The said cowl can be driven mechanically for example from the land wheels of the drill or it can be driven by the air carrying the seed or fertilizer to the distributor. Preferably a combined seed and fertilizer drill comprising two independent systems is provided.

According to another aspect of the invention, there is provided a star feeder for air-borne seed or other granular material comprising a rotatable wheel with pockets on its periphery working within a housing of such a shape that part of the periphery of the wheel contacts the inner surface of the said housing on the up-going side to provide an air seal and part of the said periphery is spaced from said inner surface to provide a clearance on the down-going side and an air pipe for conveying the seed or the like being in communication with said wheel at the said up-going side at a position below said air seal.

Figure 1:
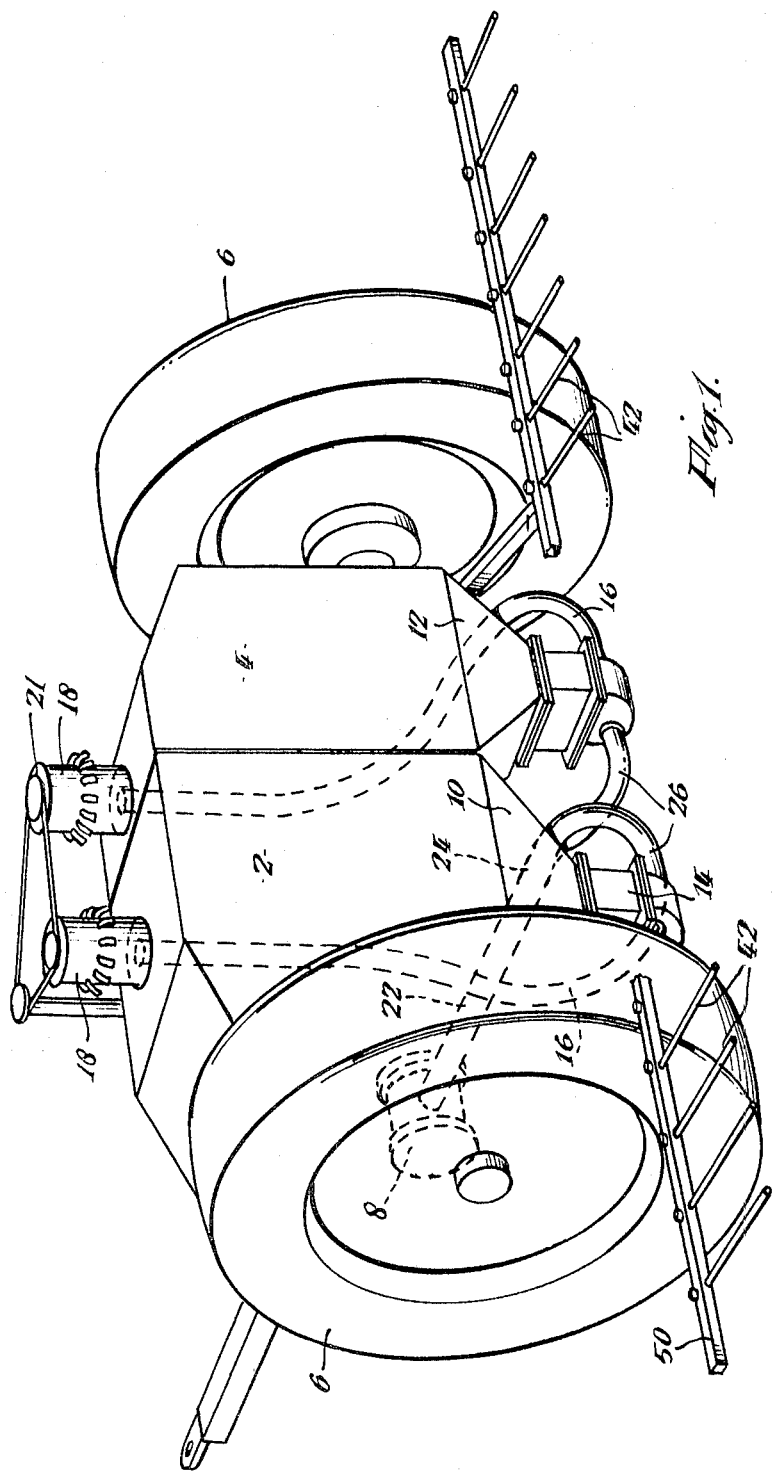
Figure 2:
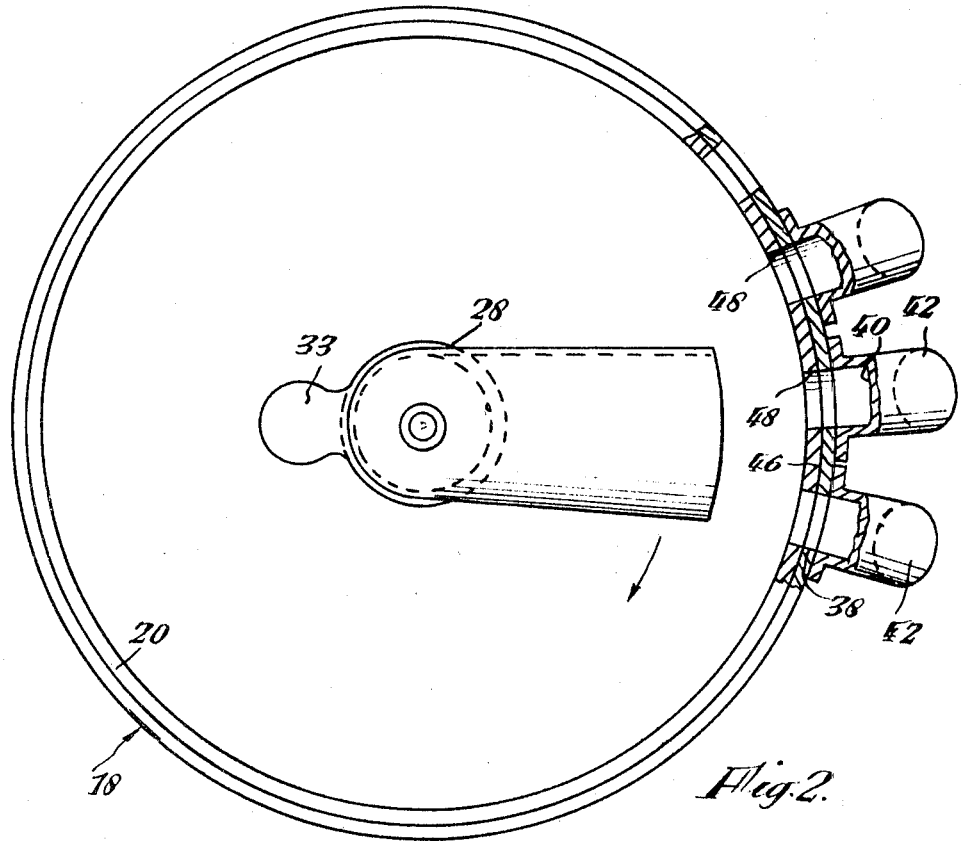
Figure 3:
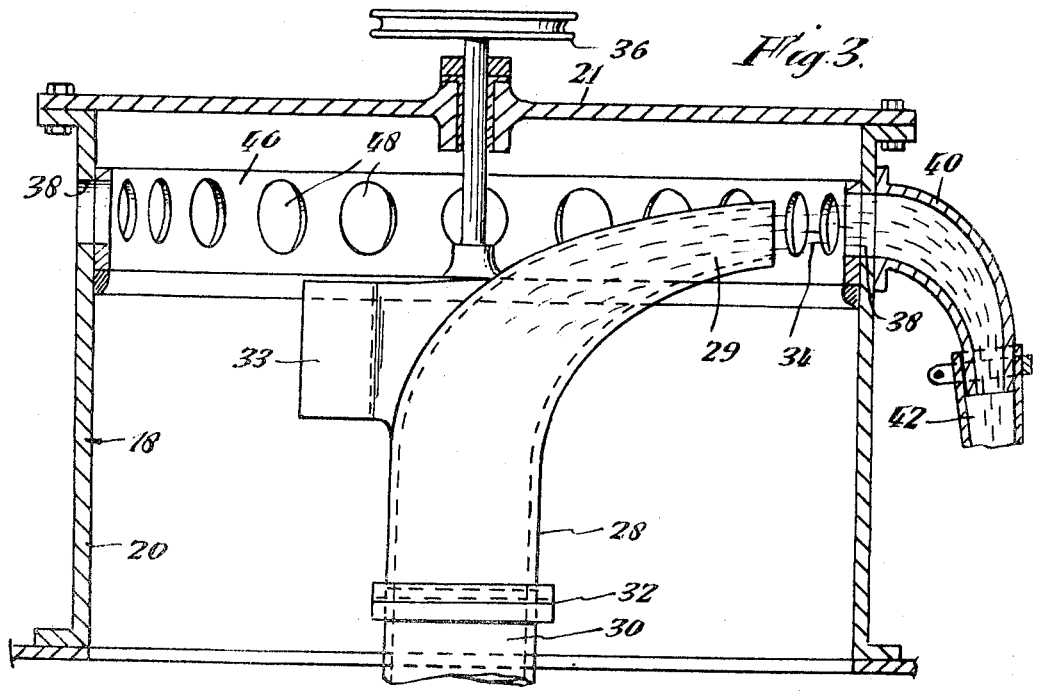

Two forms of seed and fertilizer drills are illustrated by way of example diagrammatically in the accompanying drawings:

FIG. 1 is a perspective view showing the general arrangement of the machine.
FIG. 2 is a plan view of a distributor.
FIG. 3 is sectional elevation of the distributor.
FIG. 4 is a perspective view of a modified form of distributor partly cut away for clarity.
FIG. 5 is a detail plan view of part of the cowl.
FIG. 6 is a perspective view of the hoppers.
FIG. 7 is a sectional end elevation of the star feeder.

Referring first to FIG. 1 the machine comprises two substantially bulk tank-like hoppers 2 and 4 for the fertilizer and seed—the hopper 2 for the former may be larger than that of the hopper 4 for the latter since this is sometimes the proportion in which these materials are used. These hoppers are of essentially cubical rectangular shape and are mounted side by side in the chassis of the machine, so that even if the fertilizer hopper 2 holds 1½ tons for example and the grain hopper 4, say ½ ton of grain the two tanks together need not be wider than, at most, 8' or 9' but, at the same time, their lid-openings at the top can, because of the essential shape of the tank, be sufficiently large in cross-sectional area to permit power loading of the raw materials. The said lids can open upwards and outwards and be restrained in an outward horizontal position so as to form a platform on which a quantity of sacks can be stood while filling if sack-loading is restored to. Approximately on the transverse centre line of the two tanks and on the outer extremity thereof can be mounted the two necessary land-wheels 6 which may be of fairly large diameter and section. These wheels 6 therefore will have adequate load carrying capacity without unduly compressing the ground. A centrifugal blower 8 is mounted on the drawbar frame in front of the tanks which blower can conveniently be driven by the power take-off shaft on the tractor—this blower producing the necessary volume of air at the appropriate pressure for the purpose described later on. Such volume may, for example, amount to 500 cu. ft. per minute at a pressure of 12" water gauge or such other figures as are found more desirable. The amount of power to drive this centrifugal blower will be quite small, of the order of 1-3 H.P. which will be scarcely noticeable by the tractor.

The two hoppers 2 and 4 have tapered or inverted cone-shaped bottoms 10 and 12 respectively so that material will feed easily downwards into the bottom extremity and on each tank at this point there is a mechanical feeder from the tanks respectively. Conveniently these feeders 14 are the star-wheel type, the details of which will be described later, but alternatives such as worms or augers can be used. The feeders 14 are driven from one of the land-wheels 6 so that the faster the machine travels the greater will be the rate of flow of material. Each feeder 14 deposits the metered flow of material into the bore of an air pipe 16 carrying air at high velocity from the blower 8 previously referred to in such a way that immediately each particle of fertilizer or seed of corn falls into the pipe 16 it is swept along the length of the pipe owing to the velocity of the air flow. Providing the velocity of air is fast enough the material can then be pneumatically conveyed even along vertical lengths of the main feeder pipes.

The feeders 14 are adjusted to give slightly more fertilizer and grain respectively than the maximum rate ever required by the machine, so that there will always be a slight surplus at the distributors which are described later.

Above each of the main hoppers 2 and 4 and forming part of the fixed cover thereof adjacent to the hinged lids already referred to, there is mounted a feed regulator and distributor generally indicated at 18 at the construction of which is best seen in FIGS. 2 and 3. Each distributor 18 consists of a chamber 20 about 16" in diameter and about 12" in height with a closed top 21. The bottom of the chamber 20 is open to the hopper with which it is associated so that any material surplus to requirements or not being passed down the tubes (described later) to the coulters of the machine will merely drop back into the bulk hopper and be re-used later on when its turn comes again. It will be appreciated from the foregoing that the main air pipe 22 from the centrifugal blower 8 is bifurcated at 24 into two pipes 26 one going to the feeder 14 on the fertilizer hopper 2 and the other going to the feeder 14 on the grain hopper 4 and from this point the feed pipes 16 are substantially vertical and lead at 30 into the underside and centrally to each of the two distributors 18 now being described. Inside each distributor 18 there is a rotatable cowl comprising a vertical pipe 28 terminating in a nozzle 29 receiving the air and seed or alternatively the air and fertilizer from the rising main 30. The cowl rotates on a vertical axis and by means of a simple sleeve 32 gives a substantially air-tight but revolvable connection to the fixed rising pipe 30. The cowl has a counterweight 33. The end portion 29 of the rotating cowl is shaped so as to produce a somewhat fish-tailed jet 34 of air and seed or fertilizer which will sweep round and round inside the distributing chamber 20. The drive for this rotatable cowl can easily be taken from a V-belt 36 (mounted above the top 21 of the chamber 20) from a countershaft, said countershaft being driven from one of the land-wheels 6. It will be seen therefore that the rotating distributor will rotate faster when the machine moves faster and vice versa. The suggested speed for each distributor is 300–500 r.p.m. although more or less may be used if desired. A flat or flattish spray 34 of material is thus produced sweeping round inside the distributor chamber 20, somewhat in the nature of a beam of light revolving around a light house at night.

Around the periphery of the vertical wall of the chamber 20 there is a series of openings 38 on the outside of each of which there is a suitable connector 40. Each connector 40 is coupled to a tube 42, preferably a flexible hose such as hard polythene tubing and each tube leads to one coulter. There will therefore be one fertilizer tube 42 and one grain tube 42 leading to each coulter so that each coulter will receive both materials in the appropriate amounts. It must be noted that the tubes 42 and coulters have not been shown in FIG. 1.

The main hoppers 2 and 4 are substantially air-tight when the lids are closed and also the top cover 21 of each distributor 18 is substantially air-tight so that the air pressure generated by the blower 8 will not be lost when it arrives at the distributors 18 but will build up there and will produce a high velocity air flow along the pipes. It is appreciated that there will be as many pipes 42 from each distributor as there are coulters on the machine and, for example, a 12′ wide combined drill may have 30 or 36 coulters. There will therefore be exactly this number of openings 38 in the outer periphery of each distributor and the same number of tubes.

It will be seen that as so-far-described the machine will distribute its maximum rate of seed and fertilizer into the tube system and therefore some means of regulating the flow is required. This can conveniently take the form of a circular ring-plate 46 which may be loose fit inside each circular distributor chamber. This plates 46 has an equal number of holes 48 therein as there are ports 38 in the wall 20 of the distributor and arranged so that by turning the plate 46 about a vertical axis the ports 38 in the distributor can either be completely closed or completely open or any degree of opening in between. The simple act of rotating this circular regulating plate 46 by means of a suitable external hand mechanism, will simultaneously regulate the amount of grain or fertilizer received by any pipe 42. Instead of the ring plate described, a ring movable on a vertical axis having V-shaped cut outs therein may be substituted, in which the action of raising or lowering the ring will mask or unmask the ports 38.

The action of a machine is therefore as follows. A regulated but maximum supply of seed or fertilizer is delivered to each pneumatic distributor 18. Each cowl sweeps round inside its distributor chamber 20 and ejects air and seed or fertilizer in a radially outwards direction where some or all of it can pass through ports 38 into the respective tubes 42 to the coulters. As the ports 38 are closed down by the action of the regulating ring 46 the seed or fertilizer which does not pass through the port but hits the blank surface of regulating plate 46 will simply fall back down into its own hopper below. The air pressure from the blower 8 will not only convey the material from the initial star feeders 14 to the distributor 18 but by build up of pressure inside the distributor chamber 20 will ensure that material ejected through the ports 38 will be pneumatically conveyed down a system of hoses 42 to the coulters.

Referring now to FIGS. 4, 5 and 6 this shows an arrangement where the cowl 51 in the distributor is driven by the air conveying the seed and fertilizer. The distributor comprises a lower dished member 52 and a cover 54. The lower member 52 has a flange 56 and a central aperture 58 into which the top of the rising main 30 is fixed. A series of ports 60 are provided all the way round member 52, each port 60 being in its own dish 62. A down tube 40 fixed to each port 60 leads to a coulter. It must be understood that only some of the ports 60 and tubes 40 are shown in the drawing. The cover 54 has a flange 64 which is bolted to the flange 56 to make an air tight casing. The cover 54 has a central recess 66 or boss for supporting the bearings.

The cowl 51 has vertical openings 72 in its outer periphery. Inside the cowl 51 there is provided a series of curved flutes or vanes 74 shaped so that air and grain or air and fertilizer impinging on them will rotate the cowl 51. A counterweight 76 is provided. The cowl 51 rotates on a vertical axis aligned with the axis of the rising main 30 and is mounted for rotation on a spindle 80 fixed to the top of the cowl, the said spindle extending into the recess 66 and working in antifriction bearings 82. Two distributors, one for the seed and one for the fertilizer, are mounted each on a bracket 84 welded to the back walls of the hoppers 2 and 4.

In use, when the air stream starts up, the cowl will automatically revolve as it is impelled by the air and grain or fertilizer. As the cowl sweeps round the distributor all the air-borne grain or fertilizer is of necessity, fed to the ports 60 in turn thus avoiding any material falling back into the hopper.

The coulters may conveniently be carried on a tool-bar 90 supported from the main chassis behind the material tanks 2 and 4. Because the material is pneumatically conveyed to the coulters the machine is no longer dependent on the force of gravity and therefore the coulters can be arranged in as many rows as may be convenient, say 3 rows—so as to obtain the narrowness of row spacing between adjacent rows of seeds required for maximum crop yield. It is understood that adjacent coulters should not be in the same row as otherwise they will be too near together and trash and rubbish on the surface of the field being drilled would build up on the coulters and block the machine. Therefore, by having 3 transverse rows of coulters, or 2, if desired, a certain staggering effect takes place so that trash can more easily pass between the coulters and clear itself. As is normal, there will be an arrangement for lifting the coulters out of the ground at headlands and means may be provided that when the coulters are lifted the supply of grain and fertilizer to the tube system simultaneously stops, so as to prevent waste. One convenient method of doing this is to arrange a simple linkage so that lifting the coulters automatically disconnects the land wheel drive.

Because the tool-bar 90 carrying the coulters is mounted behind the main part of the machine it can be made with the outer extremities foldable inwards for passing through narrow gates. A further advantage is the wheelmarks made by the land wheels will be removed by the coulters because they follow the land wheels instead of the normal arrangement in which the land wheels are at the extremities of the machines so that the wheel-marks are not erased by the coulters. Because of the more compact shape of the seed and fertilizer hoppers the machine can be made to carry more material than existing machines and there should be no difficulty in making it of sufficient capacity to drill 8–12 acres between re-fillings. Because the feed and fertilizer is automatically conveyed to the coulters at a high velocity a self-cleaning action in the pipe system will take place due to scouring and the risk of blockage greatly reduced. It will be seen that there are very few moving parts and such as they are can be made robust and reliable. Simple means may be provided so that the two star feeders 14 may easily be removed as complete units for cleaning or inspection purposes. Similarly the revolving distributors inside the distributor chambers may be made to come away in one piece with the distributor chamber lids for easy inspection.

The machine can easily be modified for use with large grains such as maize or peas or beans, in which case there would be fewer coulters to provide the necessary wider spacing but the ports and tubes generally would be of larger bore.

It is possible that a single revolving cowl or nozzle in the distributor chamber may give rise to a slight pulsation effect in the rate in which the seed and fertilizer emerges from the tubes into the coulters and accordingly it may be necessary to have two or more nozzles on the revolving unit. Alternatively, it would be possible to have a continuous flow revolving mushroom-like nozzle in which the rising vertical stream of air and seed or air and fertilizer would impinge against an inverted cone and be split in an outwardly direction all round, so as to emerge evenly round the entire periphery of the rim of the "mushroom." In this way a truly continuous flow would be given at every point of the compass simultaneously.

In a still further modification the form of machine described with reference to FIGS. 4, 5 and 6 can have the cowl 51 mechanically driven instead of being impelled by the air.

Furthermore, if desired the distributor 18 described with reference to FIGS. 1–3 may be modified to conform with the principles of FIG. 4 so that all the grain or fertilizer must go through the ports 38 instead of some falling back into the hoppers.

The difficulties arising in the design of a star feeder are firstly, unless the star feeder wheel is a fairly tight fit in its housing, grain will dribble down past the tips of the teeth from the hopper into the air stream even when the wheel is stationary and this unwanted dribbling may eventually block up the feed pipe during periods when the machine is not in use.

The second difficulty is that if the teeth are made to fit closely against the side walls of the star feeder housing so as to prevent the dribbling referred to, then there is a danger of such material as grain being kibbled or damaged because some grains will be crushed between the tips of the star feeder wheel teeth and the bore of the housing. For such purposes as use in an agricultural seed drill, kibbling would be a serious disadvantage as a proportion of the seed corn would be ruined.

The star feeder described with reference to FIG. 7 avoids these difficulties.

A star wheel 100 is provided with pockets 102 and teeth 104. The wheel 100 is mounted on a horizontal axis in a chamber 106 which has a larger radius bore on the down-going feed side 108 than the bore on the up-going empty side 110. In fact the bore of the empty side of the chamber can preferably be almost a perfect fit against the tips of teeth 104. Furthermore the chamber on the down-going feed side 108 extends round beyond the bottom dead-centre 112 of the star wheel 100 and continues until a small upward gradient develops in the chamber owing to continuing around the curve. The star wheel 100 will thus have many of its teeth 104 in juxtaposition with the open clearance down-going feed side 108 of the chamber but only a few teeth engaging with a fairly tight clearance up-going side 110 to provide an air seal. An air pipe 16 communicates with the chamber 106 at a position below the air seal.

It will be seen therefore, that grain or similar material will be carried down in the pockets 102 on the downward side of the chamber without any damage because of the clearance. The grain will not however dribble into the feed pipe 16 carrying the air stream because granular materials will no flow uphill with self-blocking.

On the other hand air cannot leak back up into the feed hopper 2 around the side 108 of the star wheel despite a large clearance because so many pockets are filled with grain thus creating an effective seal. On the other hand air cannot leak up into the hopper 2 on the going up side 110 because of the air seal. A horizontal slide 114 regulates the amount of seed or fertilizer passing out from the hopper and in the form of machine described with reference to FIGS. 4, 5 and 6 is the only means of regulating the rate of flow of seed and fertilizer.

It is to be understood that the dimensions and values given above are by way of example only and can be varied to suit individual requirements.

What I claim and desire to secure by Letters Patent is:

1. Seed or fertilizer drill for agricultural use comprising a hopper having a controllable outlet, means for pneumatically conveying the contents of the hopper from said outlet to a distributor and from thence to coulters, the distributor having a rotatable cowl driven by the air carrying the seed or fertilizer to the distributor for feeding pipes leading from the distributor to the coulters.

2. Seed or fertilizer drill for agricultural use comprising a hopper having a controllable outlet, means for pneumatically conveying the contents of the hopper from said outlet to a distributor and from thence to coulters, the distributor comprising a lower dish shaped member having ports in its outer peripheral portion leading to pipes, and a cover secured to said lower member, a rotatable cowl in said distributor mounted on a verticle spindle, for feeding pipes leading from the distributor to the coulters, the air carrying the seed or fertilizer being introduced from the bottom of said distributor to rotate the said cowl.

3. Seed or fertilizer drill for agricultural use comprising a hopper having a controllable outlet, means for pneumatically conveying the contents of the hopper from said outlet to a distributor and from then to coulters, the distributor having a rotatable cowl driven by the air carrying the seed or fertilizer and the cowl is provided with interior vanes and outlets in its peripheral edge portion the cowl sweeping the area adjacent to open ports provided in the distributor for feeding pipes leading from the distributor to the coulters.

References Cited

UNITED STATES PATENTS

| 1,282,697 | 10/1918 | Johnson | 302—28 X |
| 1,825,668 | 10/1931 | Kennedy | 302—28 |
| 1,727,526 | 9/1929 | Thompson | 222—193 |
| 2,760,298 | 8/1956 | Trier | 222—478 X |
| 2,772,032 | 11/1956 | Pattillo | 222—330 |
| 2,919,054 | 12/1959 | Waller | 222—135 |
| 3,189,230 | 6/1965 | Gillespie | 222—193 |

FOREIGN PATENTS

| 165,481 | 11/1958 | Sweden. |
| 343,696 | 12/1959 | Switzerland. |

ROBERT B. REEVES, Primary Examiner

F. R. HANDREN, Assistant Examiner

U.S. Cl. X.R.

222—330, 410; 302—28